United States Patent

Osterburg et al.

Patent Number: 5,357,923
Date of Patent: Oct. 25, 1994

[54] ROTARY PISTON INTERNAL COMBUSTION ENGINE

[75] Inventors: Günter Osterburg, Osnabrück; Heinrich Stallkamp, Wallenhorst, both of Fed. Rep. of Germany

[73] Assignee: Motos Motor-Technik GmbH, Wallenhorst, Fed. Rep. of Germany

[21] Appl. No.: 955,885

[22] PCT Filed: May 30, 1991

[86] PCT No.: PCT/EP91/01003

§ 371 Date: Nov. 25, 1992

§ 102(e) Date: Nov. 25, 1992

[87] PCT Pub. No.: WO91/19088

PCT Pub. Date: Dec. 12, 1991

[30] Foreign Application Priority Data

Jun. 1, 1990 [DE] Fed. Rep. of Germany ....... 4017760

[51] Int. Cl.$^5$ .................................... F02B 53/00
[52] U.S. Cl. .................................... 123/204; 123/229; 123/232
[58] Field of Search ................. 123/204, 221, 229, 232

[56] References Cited

U.S. PATENT DOCUMENTS

| | | | |
|---|---|---|---|
| 2,070,631 | 2/1937 | Sunderland | 123/229 |
| 4,487,176 | 12/1984 | Kosheleff | 123/204 |
| 5,101,782 | 4/1992 | Yang | 123/204 |

FOREIGN PATENT DOCUMENTS

| | | | |
|---|---|---|---|
| 3242431 | 5/1984 | Fed. Rep. of Germany | 123/204 |
| WO86/06791 | 11/1986 | PCT Int'l Appl. | 123/204 |
| WO91/19088 | 12/1991 | PCT Int'l Appl. | 123/204 |

Primary Examiner—Michael Koczo
Attorney, Agent, or Firm—Jordan and Hamburg

[57] ABSTRACT

A rotary piston internal combustion engine, includes a common housing; a stationary hollow hub; two rotary piston systems in the housing, each system including at least one piston rotor having partial cylindrical areas and front areas, the second rotary piston system including two piston rotors revolving symmetrically about a common axis and about the hub; bearing means for mounting the two rotary piston systems on parallel axes in the housing such that the piston rotors mesh with one another during opposite rotation of the two rotary piston systems, paths of movement of the piston rotors are annular and overlap one another in a penetration region of the housing, the partial cylindrical areas of each piston rotor of the first rotary piston system, during rotation thereof, forming a sealing gap of great depth alternately with the housing, and with the second rotary piston system or the hollow hub, and the front ends of the piston rotors of the second rotary piston system working together with front ends of at least one piston rotor of the first rotary piston system; a separate combustion chamber; a duct system for connecting the paths of movement with the separate combustion chamber; the stationary hollow hub forming part of the duct system and having a control slot, which extends axially and discharges into one annular path, and a shut-off valve assembly for controlling flow through the duct system, the valve assembly including control bodies fixedly connected with the piston rotors.

46 Claims, 15 Drawing Sheets

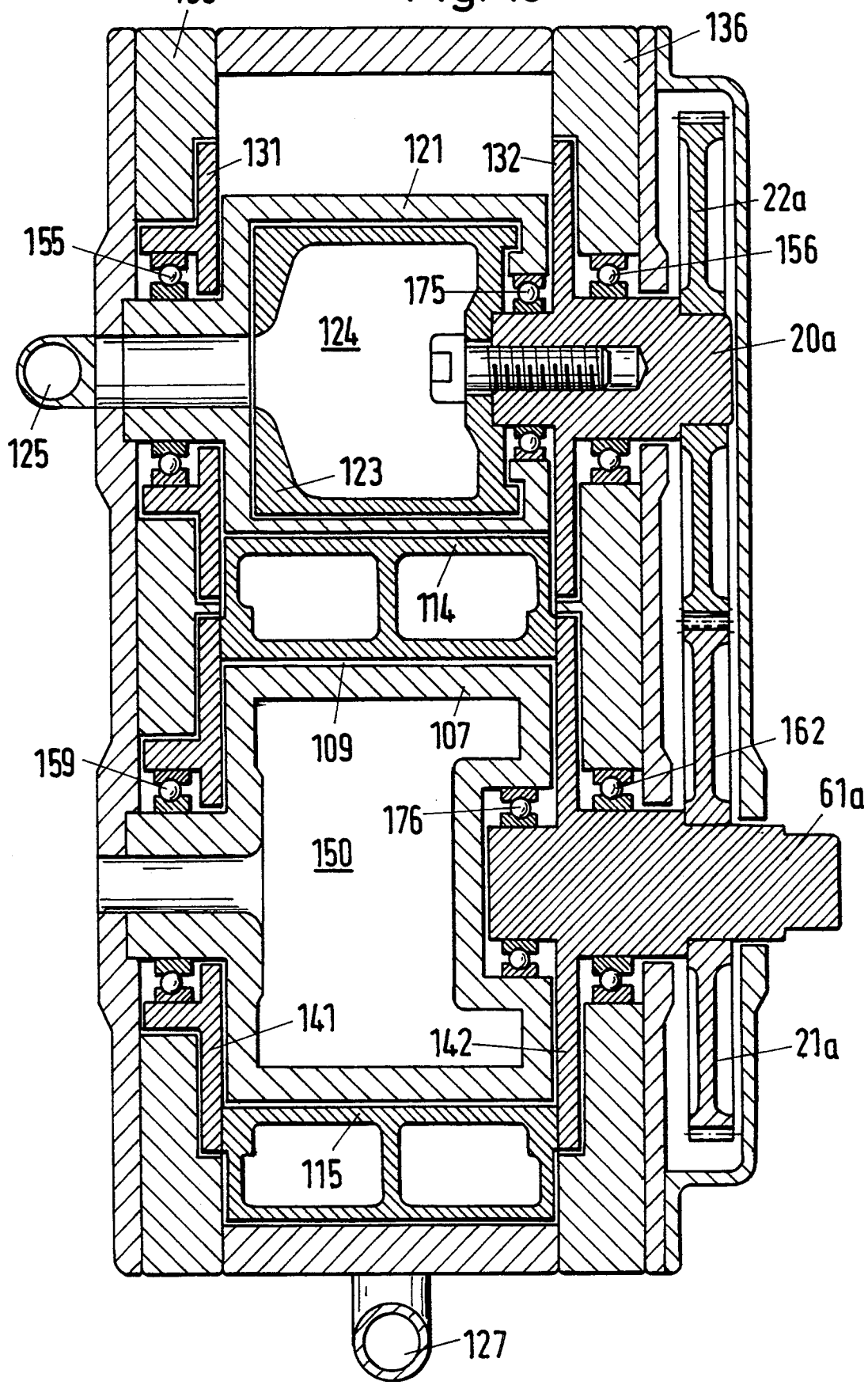

ROTARY PISTON INTERNAL COMBUSTION ENGINE

BACKGROUND OF THE INVENTION

The invention relates to a rotary piston internal combustion engine as known, for example, from the European patent 0 223 798.

The fundamental principle of the rotary piston internal combustion engine, generically taken into consideration, has a series of advantages, which include not only the out-of-balance-free running of the rotary piston, which is required particularly for high speeds, but also the functionally coordinated size of the working spaces. The peripheral contour of the rotary piston, which in each case is to run out to a sharp edge and produce with these sharp edges a leakproof contact with the other rotary piston, creates difficulties in the case of the known rotary piston internal combustion engine. Moreover, the valve functions present difficulties, since they presume high gas speeds. The periodically changing pressure relationships, moreover, led to pulsations in the combustion chambers, which have a disadvantageous effect on the continuous supplying of expansion gas. The highly inclined contour of the rotary piston, which runs out to a sharp edge, also contributes to these difficulties.

SUMMARY OF THE INVENTION

It is therefore the object of the invention to provide a rotary piston internal combustion engine, which makes a more compact configuration of the rotary, pistons possible and, at the same time, permits the valve openings to be designed with a large area and smoothes the pulsations in the combustion chamber.

Pursuant to the invention, this objective is accomplished by a rotary piston internal combustion engine. The design of at least one rotary piston system with two piston rotors, revolving symmetrically to a common axis, opens up a path to more highly rounded and more compact piston shapes, which produce a whole series of advantages, such as a uniform temperature distribution, a uniform cooling, a more uniform wear at the peripheral surfaces and relatively long sealing gaps, which therefore function like a labyrinth. The effectiveness of the running of the engine is improved significantly by reducing the air pulsation in the combustion chamber, since the amount of gas, expanding per operating cycle, is distributed among two inlet and two outlet cycles. Last, but not least, it is also achieved that the more compact piston shape with predominantly radially directed end surfaces permit simpler valve opening shapes at the control bodies, with which critical flows and high flow losses can be avoided, which result from the high gas velocities when filling and emptying the working spaces of the internal combustion engine.

The design of a piston system as a double piston system furthermore permits this system to transfer the compression as well as the expansion of gases into partial regions of its annular space, so that the other system basically need act only as shut-off piston rotor.

Moreover, the double piston system can be connected by control bodies phasewise, on the one hand, with a discharge duct to the combustion chamber and, on the other, with a hot-gas duct from the combustion chamber, so that a working space with a compressing action is opened up to the combustion chamber between a piston rotor and the shut-off piston at the end of its compression phase and this combustion chamber is provided with compressed gas (compressed air), while on the other side an expansion space between the other piston rotor and the shut-off piston is connected at the start of its expansion phase by way of the control bodies with the combustion chamber and, with that, receives gas under high pressure that is able to work.

The control bodies may comprise lateral rotary disk valves with control openings. In particular, however, the control bodies comprise a hollow hub, which has axially running control slots and carries the piston rotors. The supply or discharge of gas by way of the hollow hub opens the way to simple control openings of large area, the hollow hub acting together with a cylindrical rotary disk valve. When this revolving cylindrical rotary disk valve encloses the hollow hub (and, with closed circumferential contour, goes over into the two rotary pistons), the shut-off piston rotor would have to restrict itself to a tangential linear contact with the double piston system. On the other hand, in the sense of deeper (that is, extended in the circumferential direction) sealing gaps, provisions can be made that the stationary hollow hub directly adjoins the associated annular space and that the two power piston rotors rotate individually relative to the hollow hub. The hollow hub can then be provided with a groove, which is made to nestle against the orbit of the shut-off piston rotor. The control function can then be achieved with a cylindrical rotary disk valve, which rotates within the hollow hub with the double piston system.

It is understood that the revolving control openings of the system for the compression side are to be disposed a short distance in front of the piston rotor and that the assigned stationary control openings are near the path of the shut-off piston rotor. On the other side, the revolving control openings for the expansion side lie a short distance behind the piston rotor and the stationary openings for supplying the hot gases lie on the other side barely outside of the path of the shut-off piston rotor. In order to avoid cooperation between the revolving control openings for the compression region and the stationary openings for the expansion region (and the reverse), the openings are offset radially to one another so far (to the extent that they are disposed together at all on rotary, disk valves), that there is no overlapping.

The shut-off piston rotor can functionally be inserted in the path of the gas in the nature of an accelerator, in that it opens its annular space alternately to an air inlet on the one hand and to an air outlet on the other and, with that, supplies air to the power piston system. Moreover, the shut-off piston rotor can have a closed contour on the peripheral side, so that sealing gaps occur only on the outside. The sealing gaps, furthermore, are very long in the circumferential direction. Advisably, the shut-off piston rotor is constructed as a hollow piston. This also opens up the possibility of counterbalancing it completely.

In an alternative version, the shut-off piston system is also constructed as a double piston system. This can also assume a conveying and compressing function. The advantage of this construction is that the two piston system rotates with the same speed, so that the speed of the system is not limited only by the shut-off piston rotor.

Further characteristics and advantages of the invention arise out of the following description, in which two embodiments of the object of the invention are described in greater detail by means of a drawing. In the FIGURES, in which an axial view of the rotary pistons is reproduced, the left rotary piston (rotary piston system A) is intended to run counterclockwise, while the other rotary piston system B rotates in the clockwise direction about its own axis.

BRIEF DESCRIPTION OF THE DRAWINGS

FIG. 15 shows a section along the line XV—XV of FIG. 9.

DESCRIPTION OF THE PREFERRED EMBODIMENTS

Figure 1:
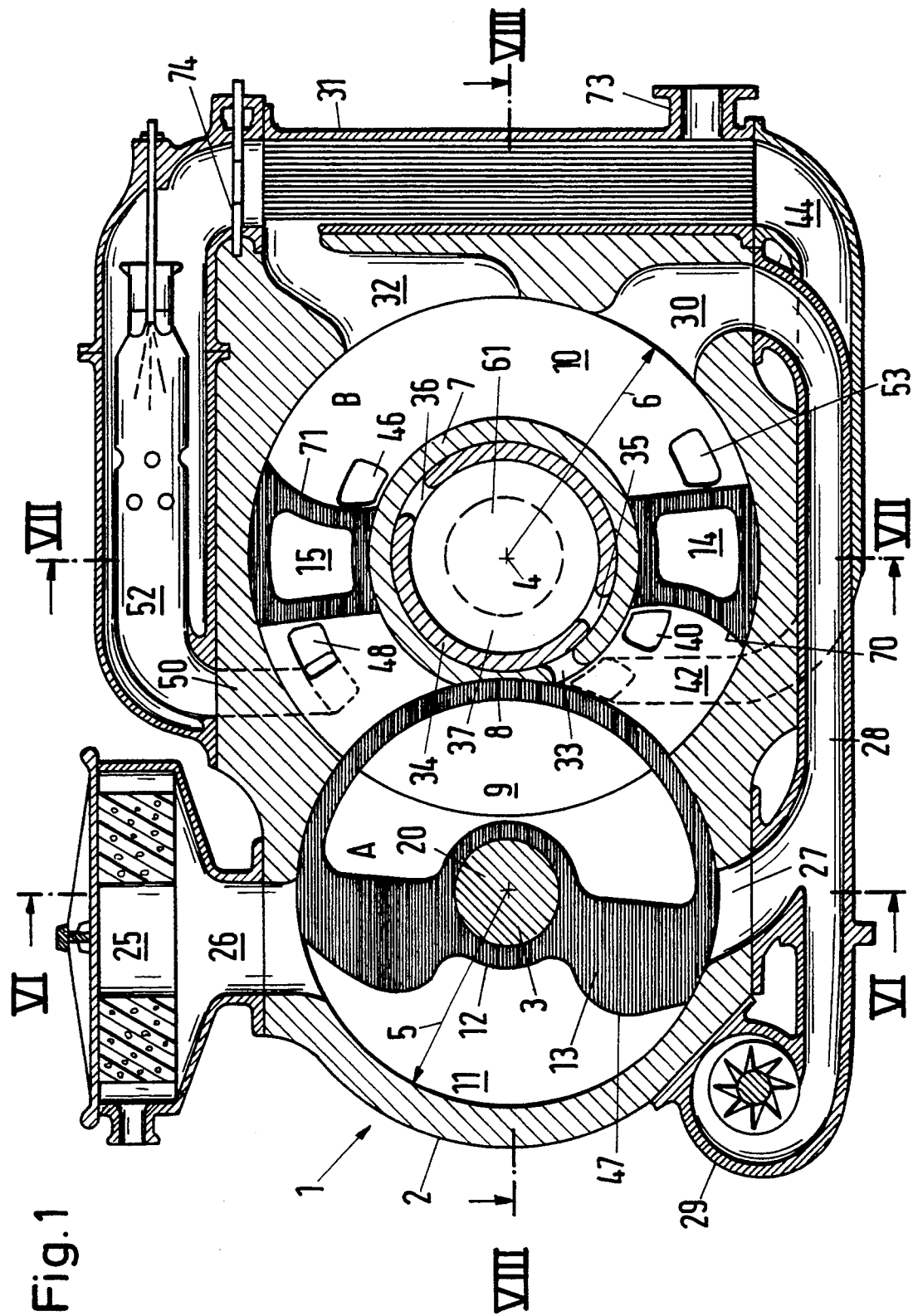
FIG. 1 shows a section through a first embodiment with a double piston in the rotary piston system B, viewed in the direction of the axis of rotation.

The rotary piston internal combustion engine, which can be seen in FIGS. 1 to 8 and is labelled 1 as a whole, comprises a housing block 2, which forms on the inside a cylindrical chamber with a free internal cross section in the form of two regionally overlapping circular areas. The centers of these circular areas lie on the axes 3, 4. The circular cross section, centered on axis 3, has a first, smaller radius 5; and the circular cross section, centered on axis 4, has a radius 6 approximately 25% larger than radius 5.

Moreover, a stationary hollow hub 7, which essentially is cylindrical at the periphery, is disposed about the axis 4. On the side facing the axis, the hollow hub 7 has a groove 8 in conformity with a depth of penetration 9 of the two circular cross sections in the cylinder block. With that, an annular space 10 is formed around the hollow hub 7. A second annular space 11 arises around the revolving hub 12 of the shut-off piston rotor 13. The annular spaces 10 and 11 overlap in the penetration area 9.

Figure 7:
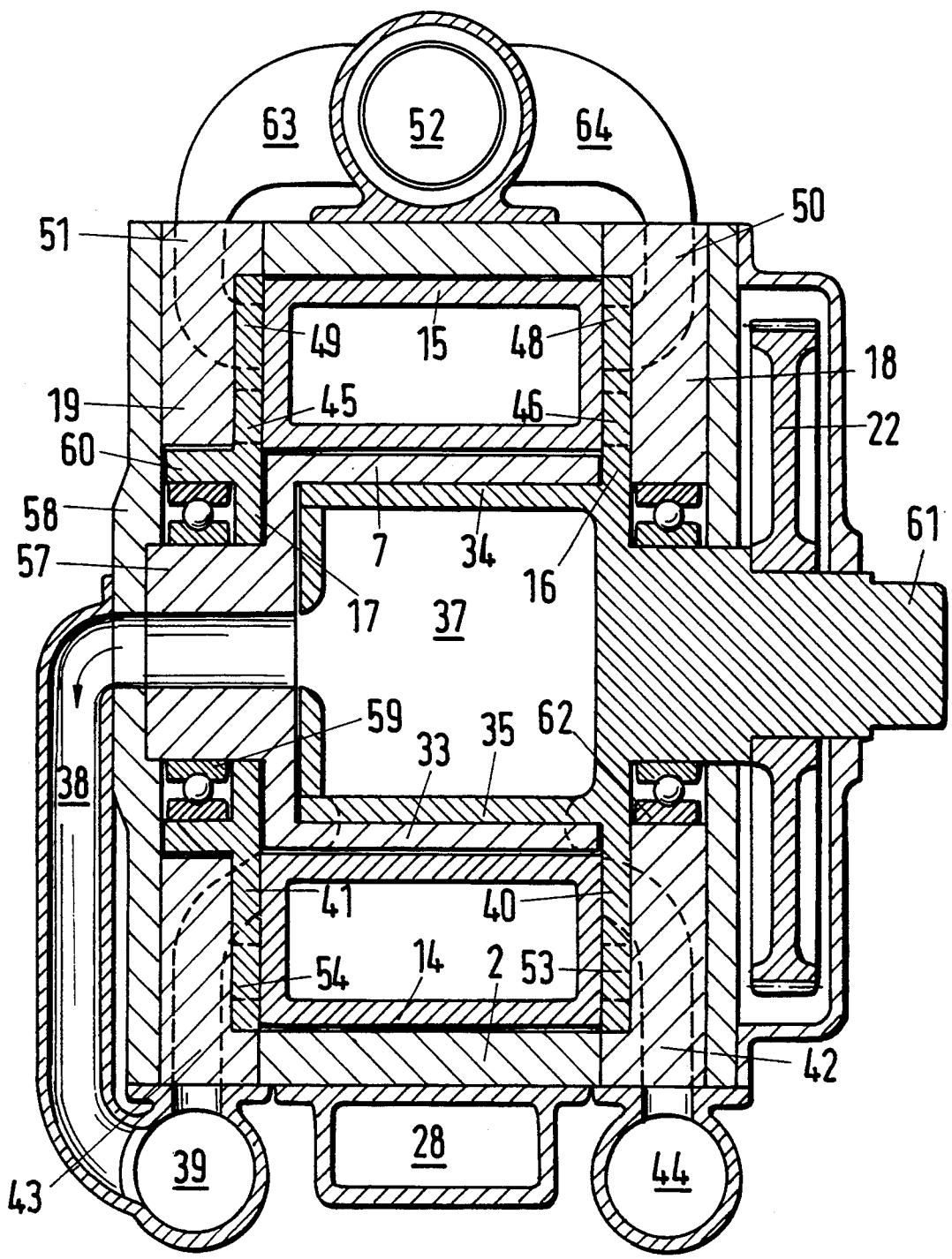
FIG. 7 shows a section along the line VII—VII of FIG. 1.

In the annular space 10, there are two power piston rotors 14, 15, which are offset by 180° and are disposed with their side faces on two rotary disk valves 16, 17 (FIG. 7) and thus form a stable power rotor. The rotary disk valves 16, 17 are sunk into two side plates 18, 19 of the housing (FIG. 7).

The counterbalanced shut-off piston rotor 13 (FIG. 1) is fastened with the hub 12 to a shaft 20. The shut-off piston rotor 13 and the power piston rotors 14, 15 are coupled through two spur gears 21, 22 (FIG. 8) with gear a ratio of 2:1. The fact that the speed of the shut-off valve rotor 13 is twice that of the power piston rotors 14, 15 has considerable advantages, such as a rapid and better shutting off of the compressor space 23 (FIG. 2) and the expansion space 24 (FIG. 3), due to the formation of a longer sealing surface, and the production of larger amounts of air with pre-compression due to the higher speed of the shut-off piston rotor 13.

FIGS. 2 to 5 represent different revolving phases. As a result of the volume increase, fresh air flows through an air filter 25 (FIG. 2) and an air inlet opening 26 into the annular space 11.

Figure 2:
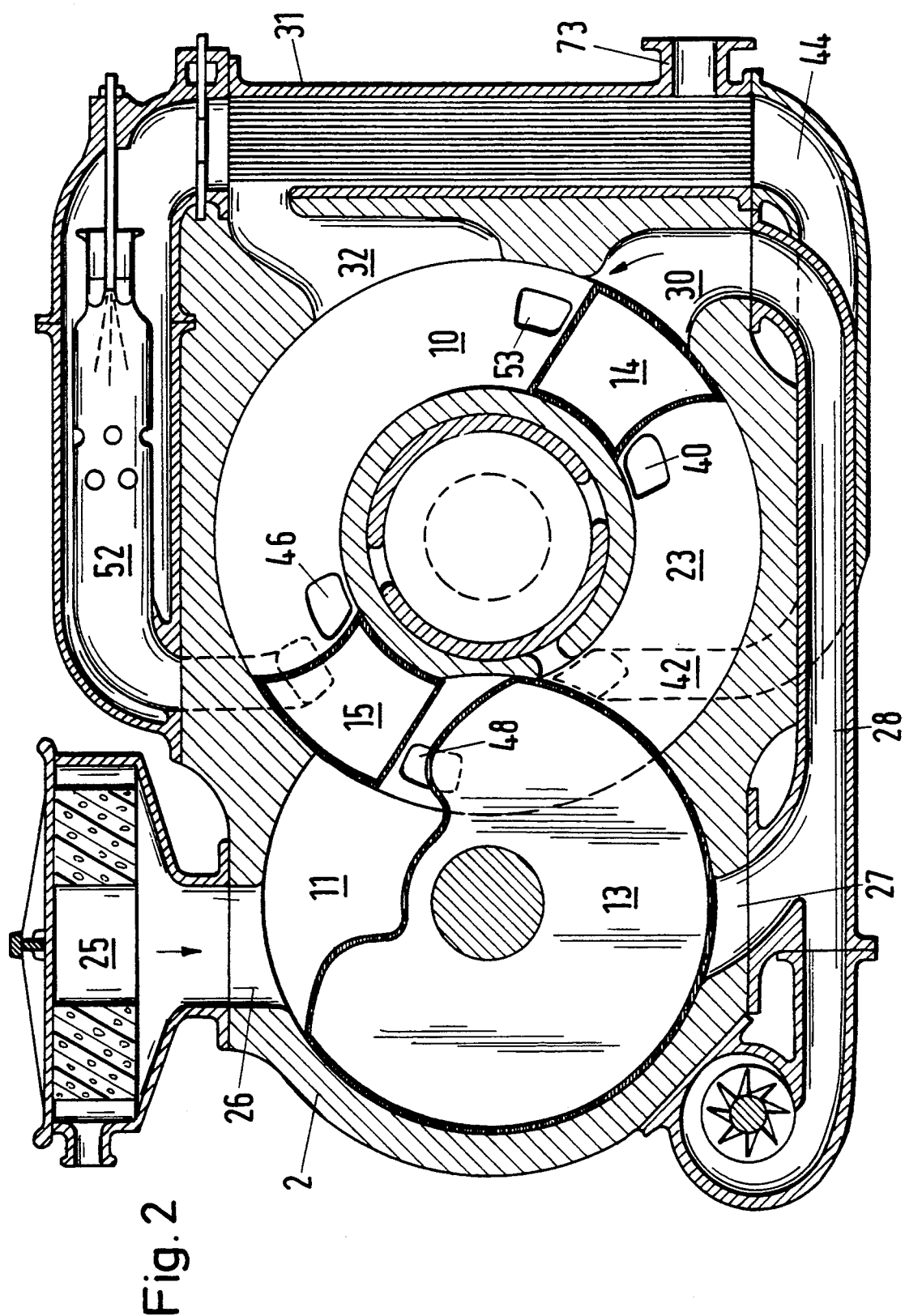
FIGS. 2 to 5 show partial, diagrammatic, sectional representations corresponding to FIG. 1 at different revolving phases.
Figure 3:
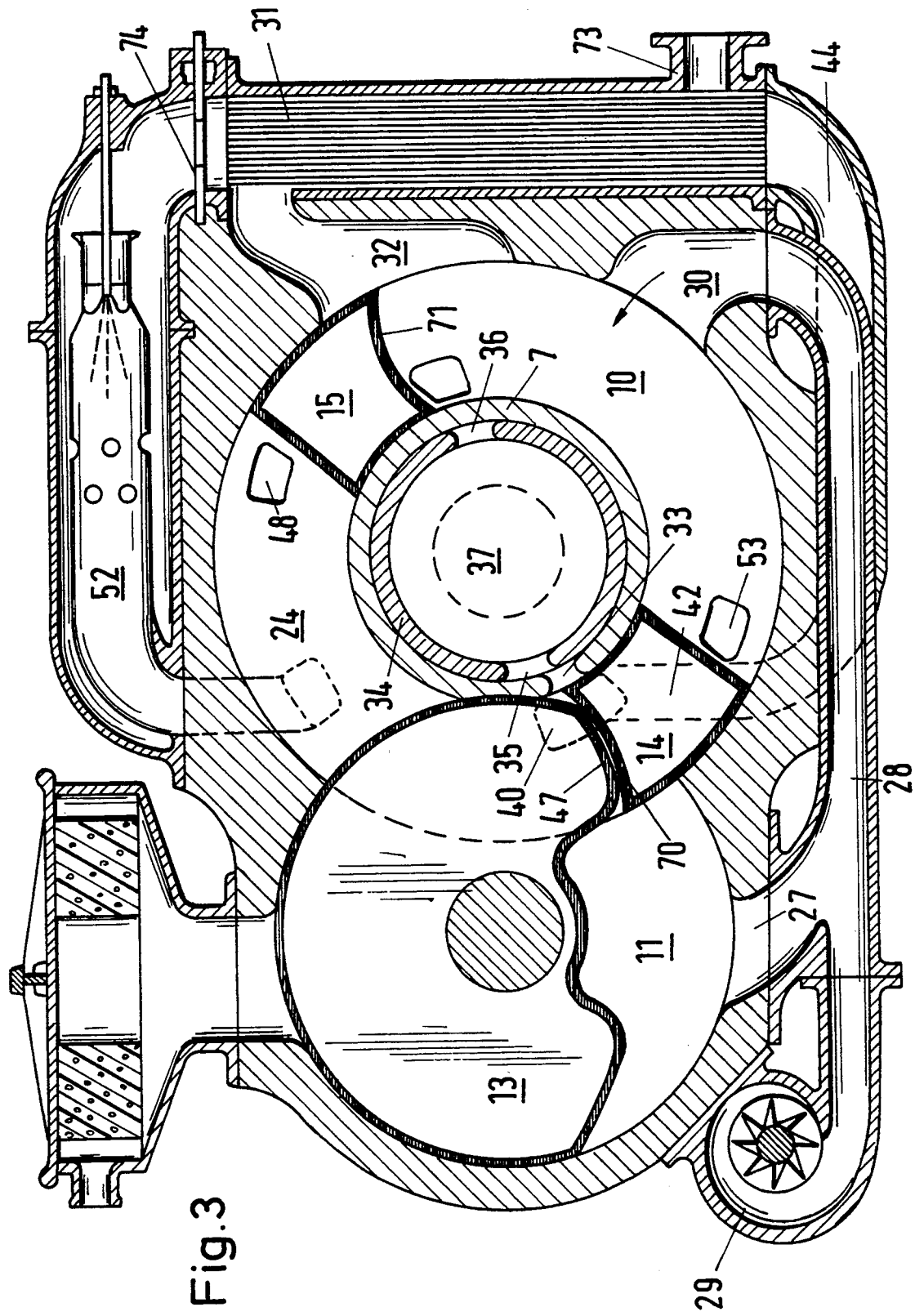

In FIG. 3, due to a decrease in the volume of the annular space 11, a portion of the fresh air is pushed through an air outlet opening 27 into an overflow line 28. The amount of fresh air can be increased by a small air blower 29, which is driven by the shaft 20 (not shown). This pre-compressed fresh air flows through a fresh air inlet opening 30 into the annular space 10. Because the pressure of the precompressed fresh air in the annular space is always higher than the counter pressure of the exhaust gas of the heat exchanger 31, it is impossible for hot, residual waste gases to reach the compression space 23 (FIG. 2), because a portion of the fresh air flushes the residual exhaust gases through the large-dimensioned exhaust gas outlet opening 32 (FIG. 3). It is a further advantage of this flushing method that it is possible to operate with a high degree of filling. In FIG. 2, the shut-off piston rotor 13 has closed off the compression space 23. The power piston rotor 14 is at the start of the compression. In FIG. 3, the final compression is almost concluded by the power piston rotor 14. A portion of the compressed air was admitted through the axial slot 33, which is in the hub 7, in which a cylindrical rotary disc valve 34 with two control openings 35, 36 is also rotating, into an inner space 37 (FIG. 3), from where it flows through a discharge line 38 (FIG. 7) to a discharge pressure line 39 and further to the heat exchanger 31. A further portion of the compressed air can flow through the control openings 40, 41, which are in the lateral rotary disk valves 16, 17 and work together with two discharge ducts 42, 43 (FIG. 7), and further through the discharge pressure lines 39, 44 to the heat exchanger 31. Control openings 45, 46, opposite to one another on both sides, are assigned to the power piston rotor 15.

FIG. 7: Due to the three large-dimensioned discharge openings in the compressor part, the harmful space is enlarged slightly. It has turned out, however, that the air velocity in revved up engines must not significantly exceed 150 m/sec in the discharge openings, because the throttling losses will then increase out of proportion.

In order to achieve precise sealing of the area (FIG. 3) between curved end surfaces 70, 71 of the pistons of the power piston rotor 14, 15 and the end surface 47 of the shut-off piston rotor 13, three factors are of importance:

1. the axial distance between the rotary piston systems A and B,
2. the diameter of the shut-off piston rotor 13 and
3. the diameter of the power piston rotors 14, 15.

Figure 4:
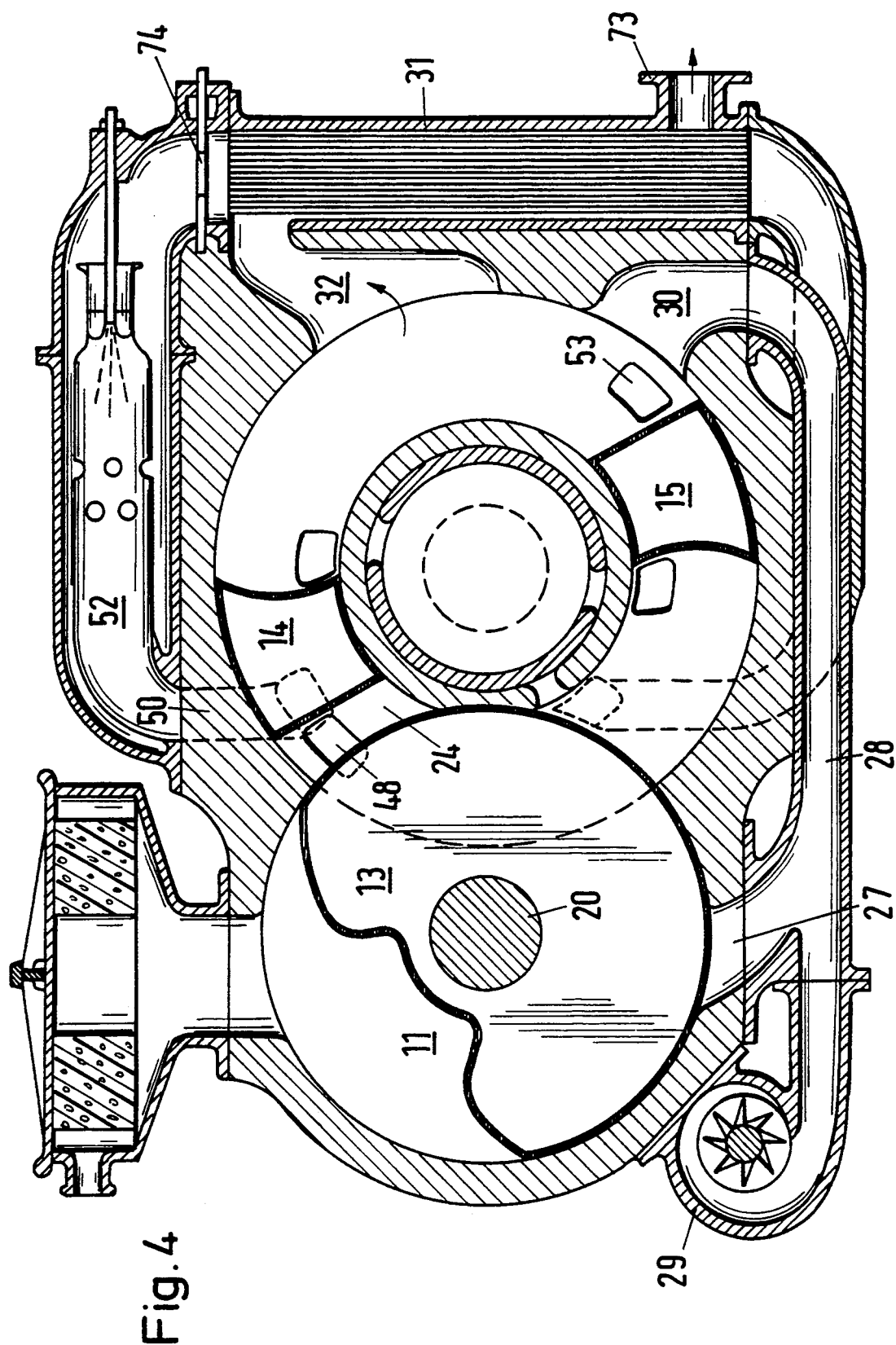

Through extensive series of investigations on models, it was possible to find the optimum asymmetric curves of two piston end surfaces 70, 71 and the fitting asymmetric curve of the end surface 47 of the shut-off piston rotor 13. In FIG. 4, the shut-off piston rotor 13 has closed off the expansion space 24. The power piston rotor 14 is at the start of the expansion. The hot-gas inlet openings 48, 49 of the rotary disk valves 16, 17 now open the hot gas ducts 50, 51 of the combustion chamber 52 (FIG. 7), which is acted upon by pressure, so that the working gas is admitted to the expansion chamber 24 behind the power piston rotor 14 (FIG. 4). Said hot gas ducts 50, 51 are encased in side plates 18, 19 of the housing. The hot gas inlet openings 53, 54 are offset by 180° to the hot gas inlet openings 48, 49 in the rotary disk valves 16, 17 (FIG. 7).

The hot gas inlet openings 48, 49 and 53, 54 respectively lie on a larger radius than the fresh air inlet openings 40, 41 and 45, 46 respectively in the respective rotary disk valves 16, 17 behind or in front of the piston rotors. With that, the control openings, which must be mutually offset in the angle at the circumference, are separated from one another by different path radii.

Figure 5:
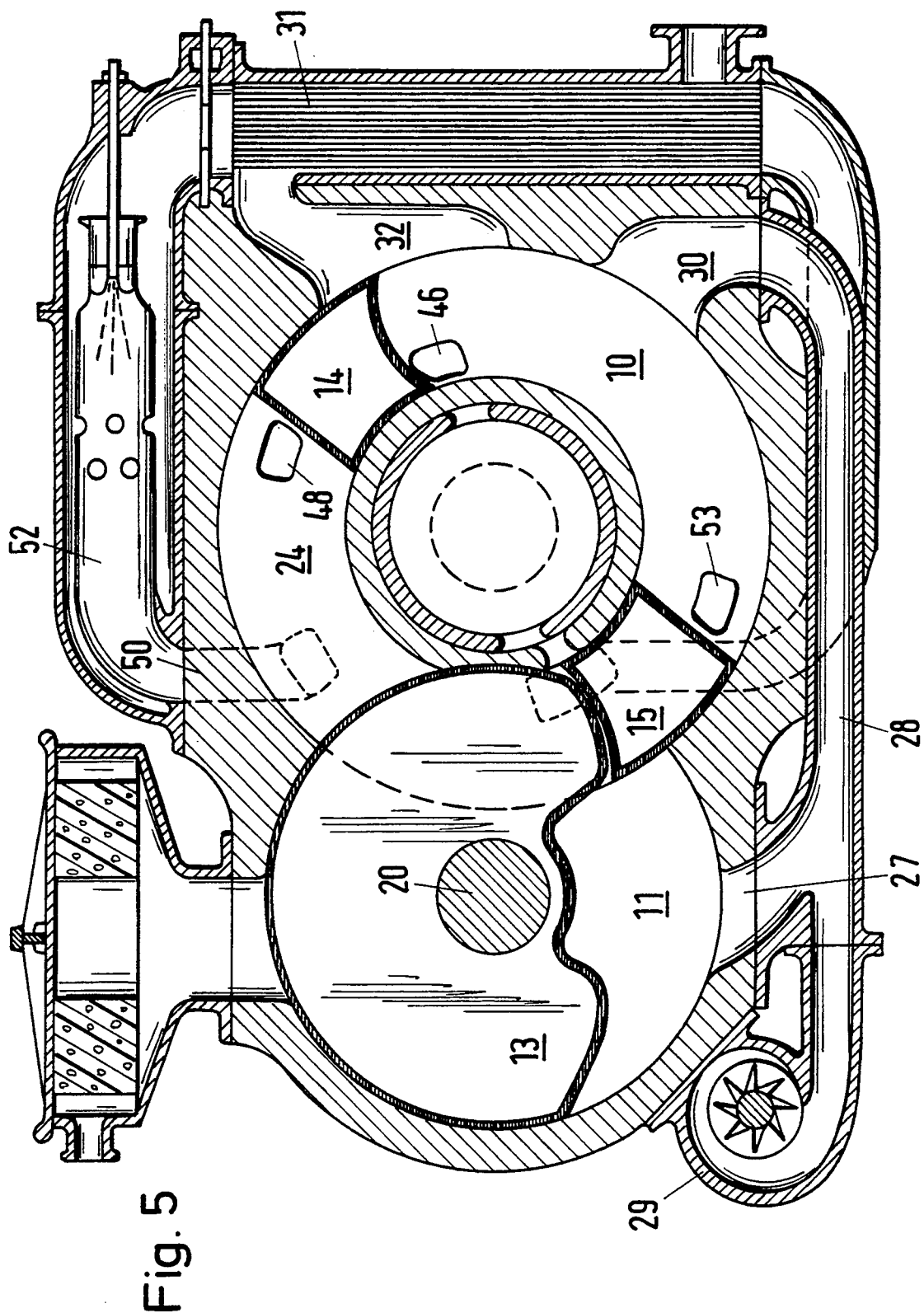

In FIG. 5, the power piston rotor 14 has almost reached the final expansion position, while the power piston rotor 15 has almost reached the final compression position. It can also be readily seen in FIG. 5 that a portion of the expansion work is transferred directly to the compression work, without any load being placed on the set of gearwheels, which must absorb merely the slight torque of the precompression of the shut-off rotor and the acceleration and deceleration forces.

In FIG. 2, the power piston rotor 14 has opened the large-dimensioned exhaust gas opening 32 in the housing block 2, so that a large portion of the hot exhaust gases is discharged through the heat exchanger 31, which operates on the counter-current principle, to an exhaust gas connecting piece 73. Whereas in FIG. 2 the power piston rotor 14 opens the fresh air inlet opening 30 and as a result, a pressure above atmospheric pressure develops in the annular space 10, the power piston rotor 15 is at the start of its exhaust gas ejection position. In FIG. 3, the power piston rotor 15 has reached almost the final position of the ejection cycle. Due to the pre-compression of the fresh air in the annular space 10, the residual exhaust gases and a small portion of the fresh air were ejected through the exhaust gas opening 32.

Although very little in the way of pollutants is ejected because of the high combustion efficiency resulting from the continuous combustion in the combustion chamber 52, the admixture of fresh air to the hot exhaust gas stream resulting from flushing losses has a positive effect on further reductions in the amounts of pollutants, because it produces a post-oxidation. In order to achieve a high overall efficiency, the process temperature aimed for should be as high as possible. If the exhaust gas temperature is lowered due to the admixture of flushing air, the materials of the heat exchanger 31 can be more reasonably priced. In order to be able to build up as high a working pressure as possible in the compressor system when the rotary piston internal combustion engine 1 is started, a valve 74 of the combustion chamber 52 is closed (FIG. 4).

Figure 6:
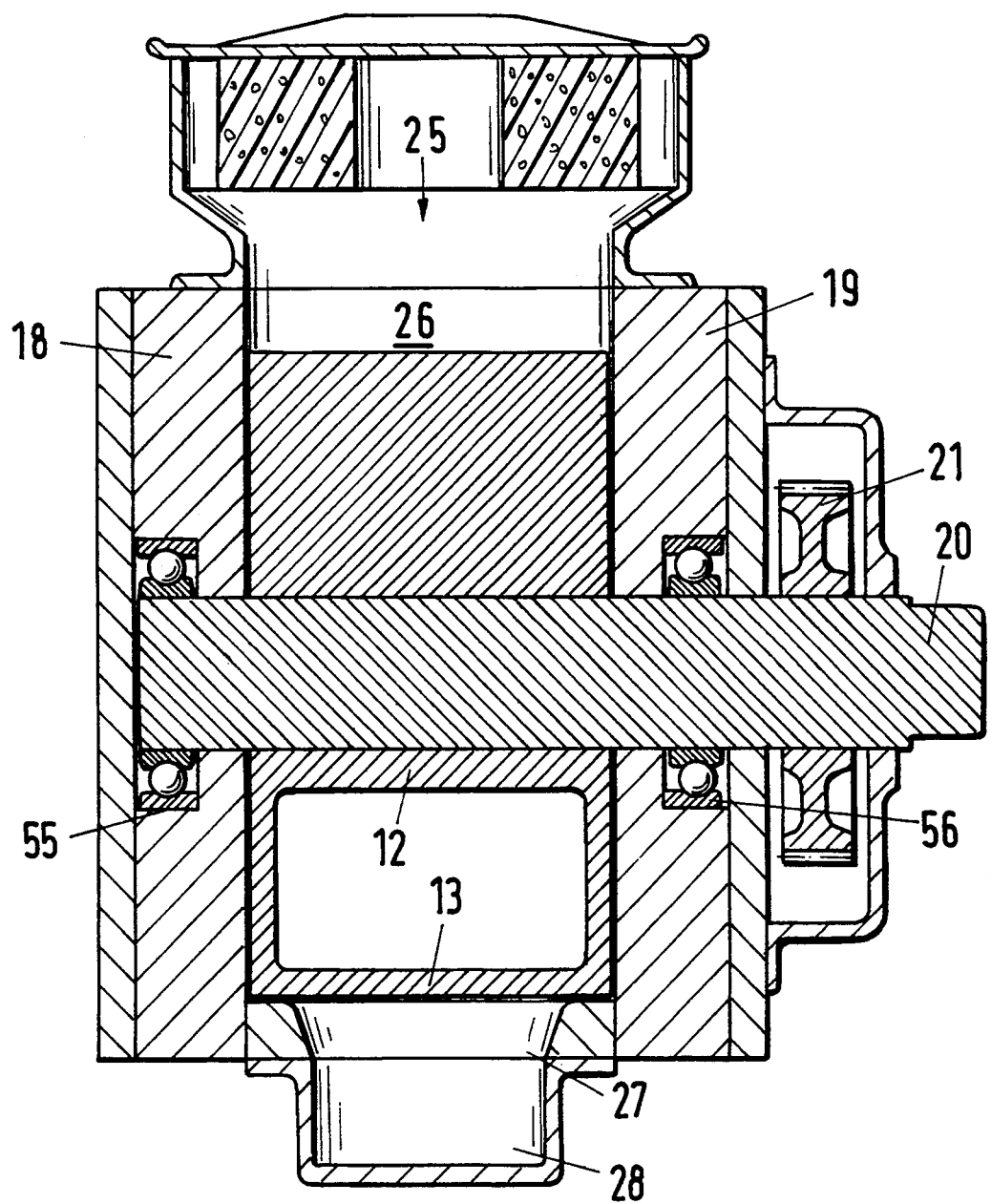
FIG. 6 shows a section along the line VI—VI of FIG. 1.

The section through the area of the shut-off piston rotor 13 shown in FIG. 6 gives more detailed information concerning the structural design of the rotary piston internal combustion engine 1. In the two side plates 18, 19 of the housing, rolling bearing 55, 56 are disposed, which accommodate a shaft. 20. The shut-off piston rotor 13 and the spur gear 21 are rigidly connected with the shaft 20.

The air filter 25, the fresh air inlet opening 26, the fresh air outlet opening 27 and the overflow line 28 can be seen in FIG. 6.

A sectional axial view through the area of the power piston rotors 14, 15 (FIG. 7) gives more detailed information concerning the structural design of the rotary piston internal combustion engine 1. The power piston rotors 14, 15 are rigidly connected with the rotary disk valves or control bodies 16, 17, which are encased in the side plates 18, 19 of the housing.

A cylindrically shaped end connecting piece 57 of the hollow hub 7 is bolted together tightly with a side support plate 58 and forms a rigid unit. The end connecting piece 57 accommodates a rolling bearing 59. The revolving outer housing of the rolling bearing 59 is fastened to a supporting ring 60, which is connected with the rotary disk valve 17. The cylindrical rotary disk valve 34 and a drive shaft 61 form with the rotary disk valve 16 a rigid unit. The stationary outer housing of a rolling bearing 62 is connected with the side plate 18 of the housing, while the inner housing of the rolling bearing 62 rotates with the drive shaft 61.

Figure 8:
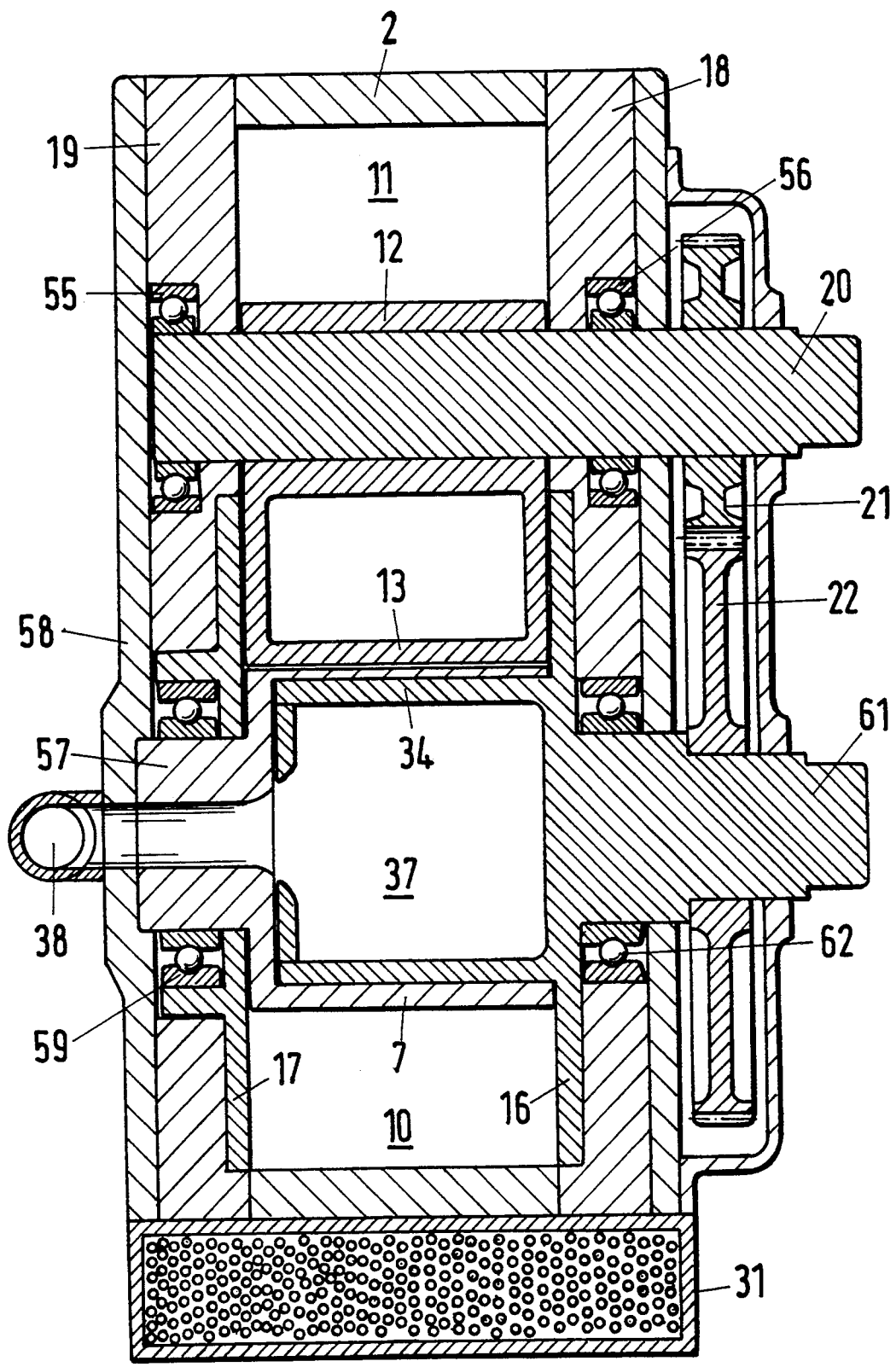
FIG. 8 shows a section along the line VIII—VIII of FIG. 1.
Figure 9:
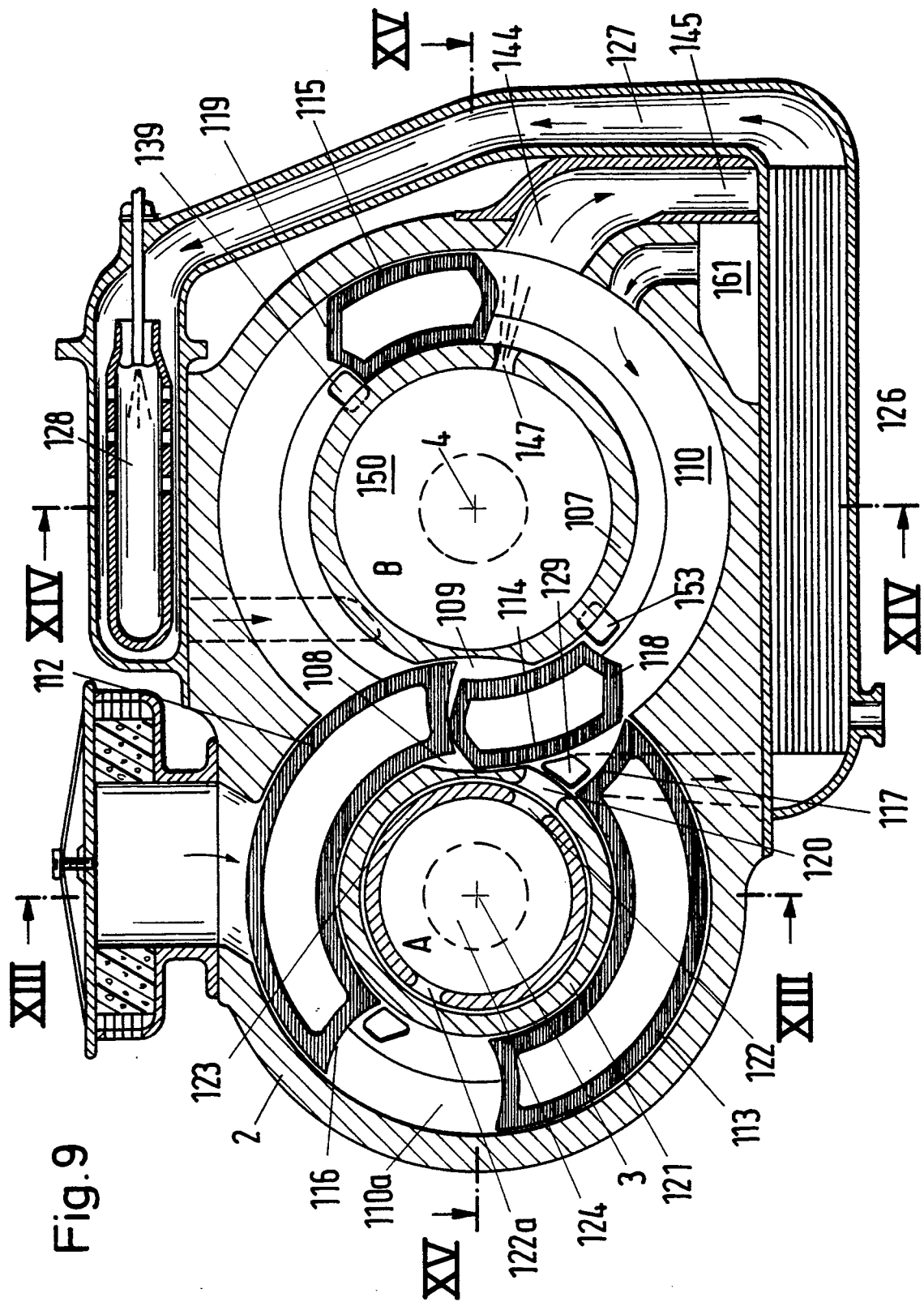
FIG. 9 shows a section through a second embodiment with double pistons in the rotary piston systems A and B, viewed in the direction of the axis of rotation.

Manifold pipes of the combustion chamber 52, which carry hot gases, are labelled 63 and 64. FIG. 8 shows the very compact and simple construction of this internal combustion engine 1, which is distinguished particularly as a high-velocity engine and thus by a high energy density.

This novel rotary piston system can also find application for other power and working machines, such as expansion machines, compressors and chargers.

In a second embodiment of FIGS. 9 to 15, both of two rotary piston systems A, B are constructed with two double pistons 112, 113, 114, 115, With this design of the rotary piston internal combustion engine, an extremely high speed consistency and thus a high energy density can be attained, because, first of all, the system-determined construction is well counterbalanced and manages without massed compensating weights, secondly the two pistons run at the same speed (speed ratio 1:1) and thus both can be designed for limiting speeds and, thirdly, all control openings and duct cross section are designed sufficiently large, that the gas velocity is lowered, so that the throttling and flow losses are reduced. At the same time, the pistons 112, 113 act as shut-off pistons and the pistons 114, 115 as power pistons. With this embodiment also, an advantageous area seal (with labyrinth) can be used in the compression space 110 during the final compression, because concave piston end faces 116, 117 of the shut-off pistons 112, 113 work together with convex end faces 118, 119 of the power pistons 114, 115.

Figure 10:
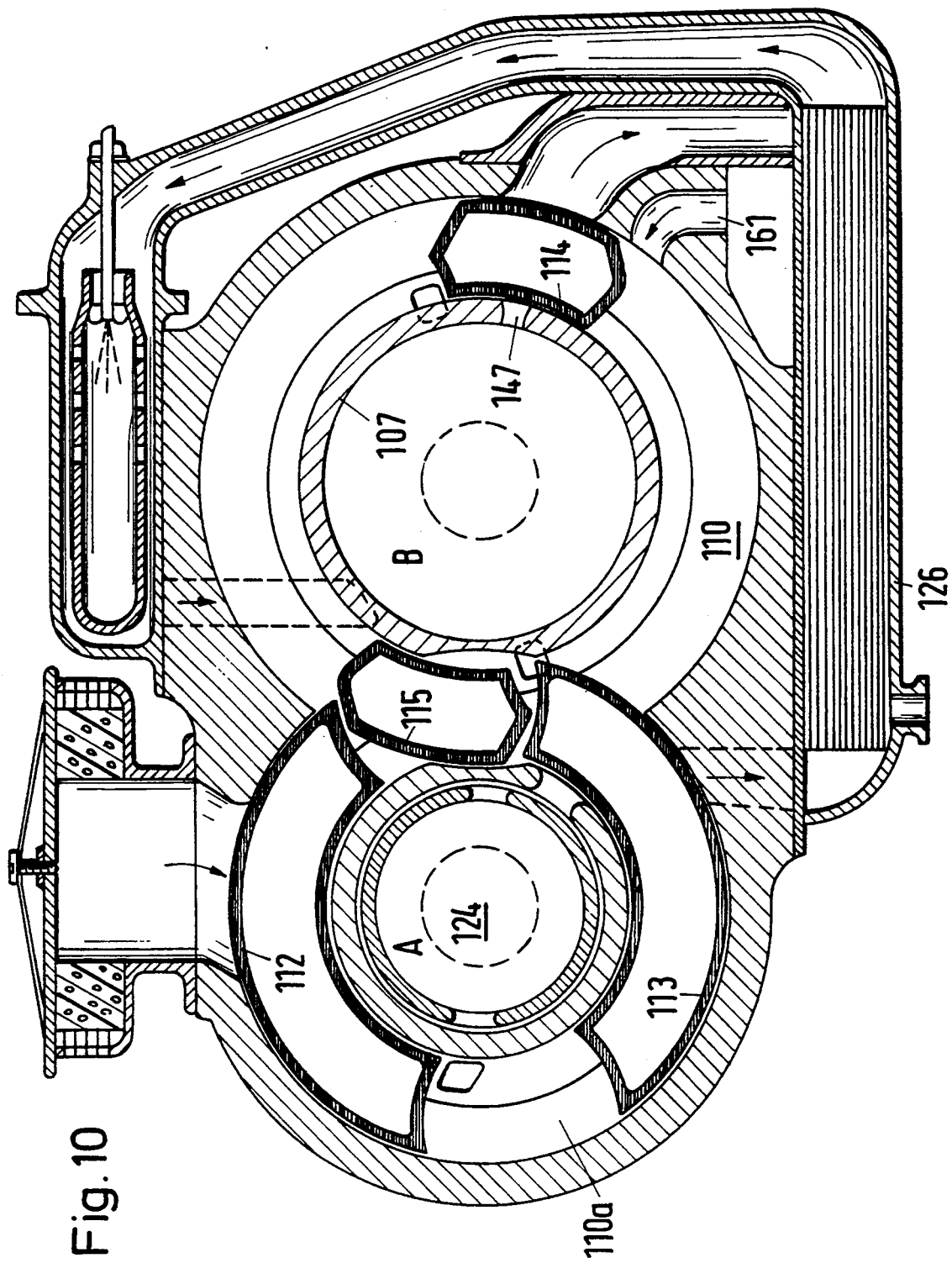
FIGS. 10, 11 and 12 show a partial, diagrammatic, sectional representation corresponding to FIG. 9 at different revolving phases.
Figure 11:
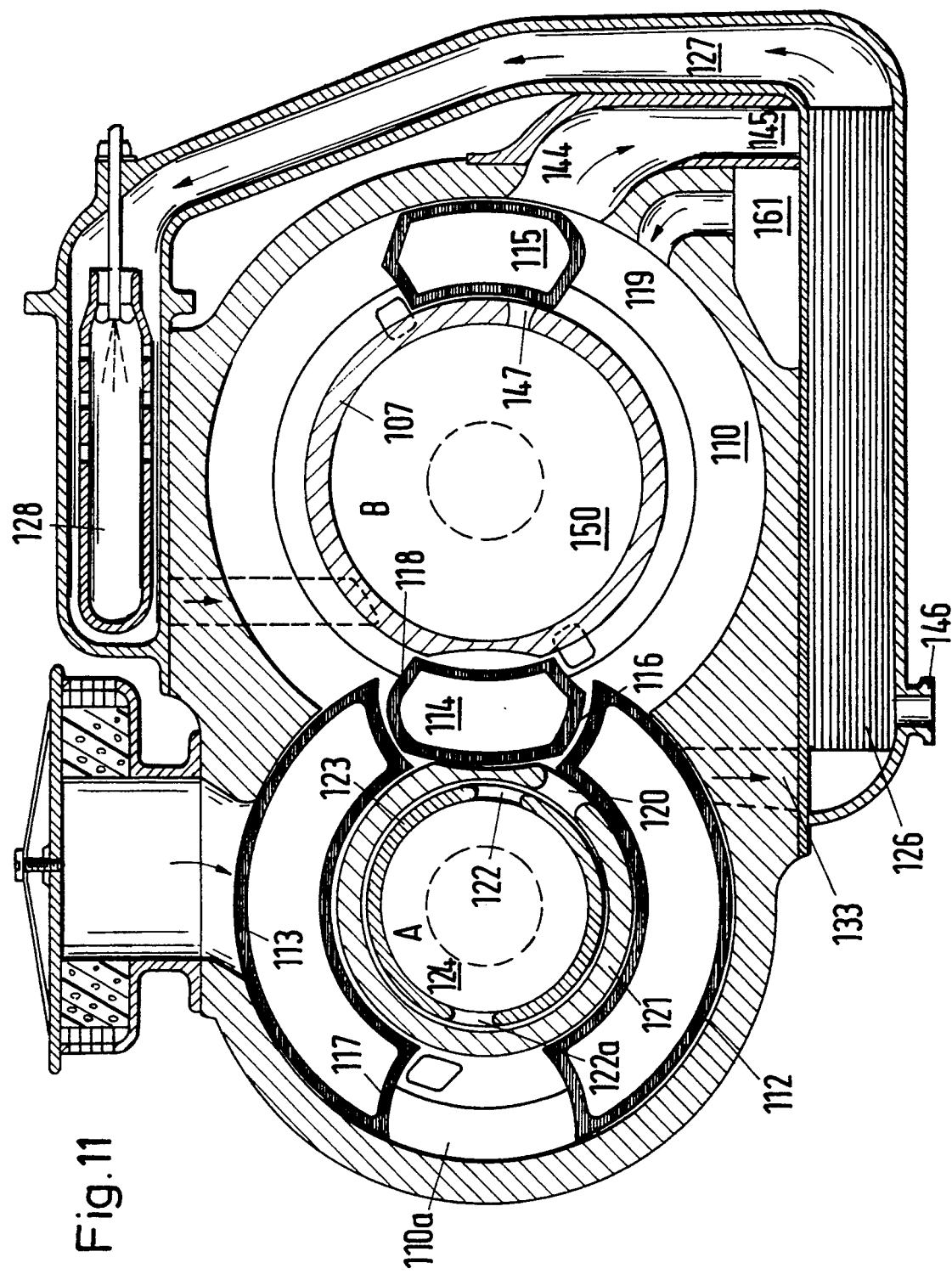
Figure 12:
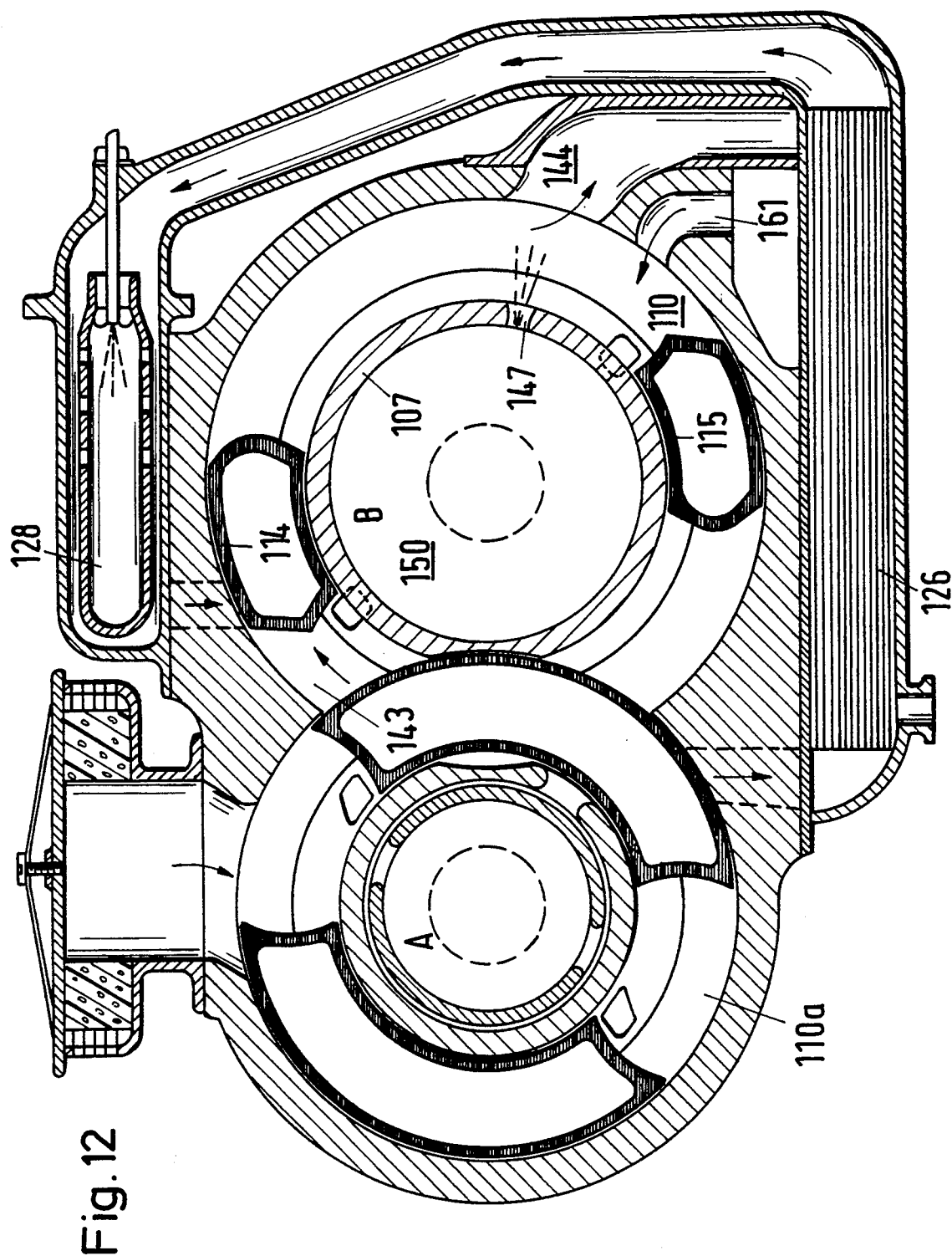

FIGS. 10, 11, 12 show the mode in which the second embodiment functions. In FIG. 10, the shut-off piston rotor 113 has closed off the compression space 110, so that fresh air, for example, from a small charger blower (not drawn) is filled through the fresh air inlet opening 161 into the compression space 110 of the rotary piston system B. An additional amount of fresh air, which is in an annular space 110a of the rotary piston system A is conveyed by the revolving of the shut-off rotors 112, 113 also into the compression space 110 and compressed there. The power piston 114 is at the start of the compression cycle. In FIG. 11, the power piston 114 has compressed the air and a portion thereof is pushed into the pressure space 124 through a stationary, axially extending discharge opening 120, which is disposed in a stationary hub 121 and is connected through a control opening 122 of the cylindrical rotary disk valve 123, which rotates with the shut-off piston 112, 113. From the pressure space 124 (FIG. 13), an overflow line 125 leads to the heat exchanger 126 (FIG. 11). The compressed air flows through the heat exchanger 126 and, in so doing, absorbs heat energy out from the hot exhaust gases. The preheated compressed air flows through a thermally insulated rising pipe 127 to the continuously operating combustion chamber 128. In addition, two pressure discharge openings 129, 130 (FIG. 13) are disposed in the lateral rotary disk valves 131, 132, which rotate with the shut-off pistons 112, 113. The flow through the lateral rotary disk valves 131, 132 is axial and said valves work together with discharge ducts 133, 134, which are located in two side plates 135, 136. The assigned, stationary valve openings (not shown) are adjacent to the discharge opening 120. Discharge ducts 133, 134 discharge into the heat exchanger 126 (FIG. 11). The controlled discharge openings of the compression space 110, which are thus present 3-fold, produce only slight throttling and flow losses even at high speeds.

In FIG. 12, the power piston 114 has reached the starting position of an expansion. The hot working, compressed gas of the combustion chamber 128 flows through the hot gas ducts 137, 138 (FIG. 14) and on through the inlet opening 139, 140 of the rotary disk valves 141, 142 behind the power piston 1114 into the expansion space 143 (FIG. 12).

In FIG. 10, the power piston has almost reached the end position of the expansion. The power piston 115 moves to the starting position of the ejection cycle.

In FIG. 11, the power piston 115 has ejected the exhaust gas through an exhaust gas discharge opening 144 and exhaust gas line 145 into the heat exchanger 126 and further through an exhaust gas connection piece 146. The compression space 110 has filled up again with fresh air.

In FIG. 12, it can be seen particularly well how the exhaust gas ejection cycle is supported by a flushing slot 147, which is provided in a hollow hub 107 of the inner housing opposite to the exhaust gas discharge opening 144.

Figure 14:
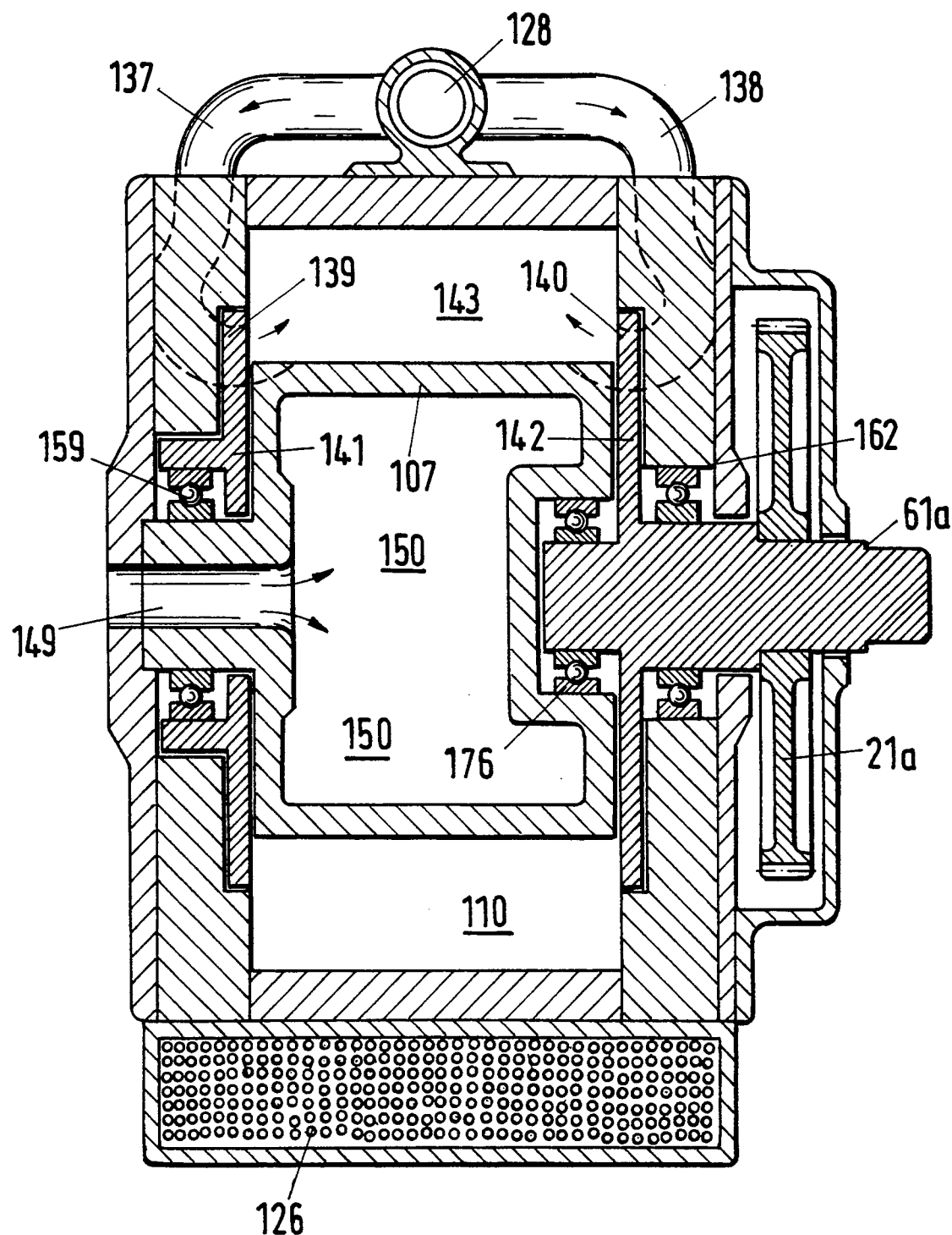
FIG. 14 shows a section along the line XIV—XIV of FIG. 9.

In FIG. 14, flushing air, which is taken either by a charging blower or also from the compressed air of the compression part, flows through the inlet line 149 into a free inner space 150 (feed lines partially not shown).

In FIG. 12, the flushing air flows from the inner space 150 through the flushing slot 147 as a flat jet into the flushing region. In addition, the fresh air flows through the fresh air inlet opening 161 into the annular space 110 in the compression region.

Because the pressure of the fresh air is somewhat higher than the counterpressure of the heat exchanger 126, it is not possible for the exhaust gases to penetrate into the annular space 110 in the compression area, not even at high speeds. It is a further advantage that it is possible to operate with a high degree of filling in all speed ranges.

In order to attain a high thermodynamic efficiency, the compression ratio $\epsilon$ must be 5.3. This value corresponds to a pressure ratio $\pi_v$ of 10 bar. Additional measures are possible for keeping the gap losses as low as possible. For example, suitable honeycomb structures can be incorporated, for example, by etching, as labyrinth seals into the mutually facing surfaces of rotary pistons and the inner housing of internal combustion engines constructed of metal. The edge surfaces of the honeycomb structures should be so small, that there is no sticking of the rotors due to contact resulting from thermal expansion of the components, because the labyrinth surfaces abrade somewhat.

In internal combustion engines of metal construction with additional inner coatings of thermally insulating ceramic layers of, for example, aluminum titanate or zirconium oxide, applied by thermal spraying methods, honeycomb structures, as labyrinth seals, can additionally be incorporated by etching methods into these ceramic layers, with the advantage of lesser heat losses and low thermal distortion of the components, so that low gap heights are possible and thus very low leak losses are attainable.

Ceramic inlet layers, as used in jet engines, offer a very good possibility for sealing the gap. Fiber reinforced high performance ceramics offer a great development potential particularly for this construction of the internal construction engine.

Although this internal combustion engine could do without cooling cycle, it may be advantageous to reduce thermal expansion by controlled cooling of the housing and also of the rotors to such an extent, that very low gap heights are attained.

In the second embodiment of FIGS. 9 to 15, a very advantageous further reduction in the lowering of the air pulsation achieved in the combustion chamber already achieved in the first embodiment may be noted. The power piston rotors 114, 115, which run synchronously over spur gears 21a, 22a, and the shut-off piston rotors 112, 113 mesh with one another in the penetration region 109, so that two compression and two expansion processes are realized per piston revolution. At the compressor and at the expansion rotor, the two rotary pistons, which are offset by 180°, are bolted together with the rotary disk valves 131, 132; 141, 142. This symmetrical construction of the rotating parts of the system enables rolling bearings 155, 156, 159, 175, 176 (FIG. 15) to be used, since a vibration-free run is achieved at speeds up to 25,000 r.p.m., because the rotary pistons are counterbalanced before the bearings.

For one revolution of the compressor rotor (rotary piston system B), there are two intake and two compression cycles. With this, the amount of air per working cycle is less and the ratio of the size of the discharge opening to the throughput of air becomes more advantageous. With this, air pulsations in the combustion chamber 128 are smoothed already at 3,000 r.p.m. and the extinguishing limit is no longer reached.

Figure 13:
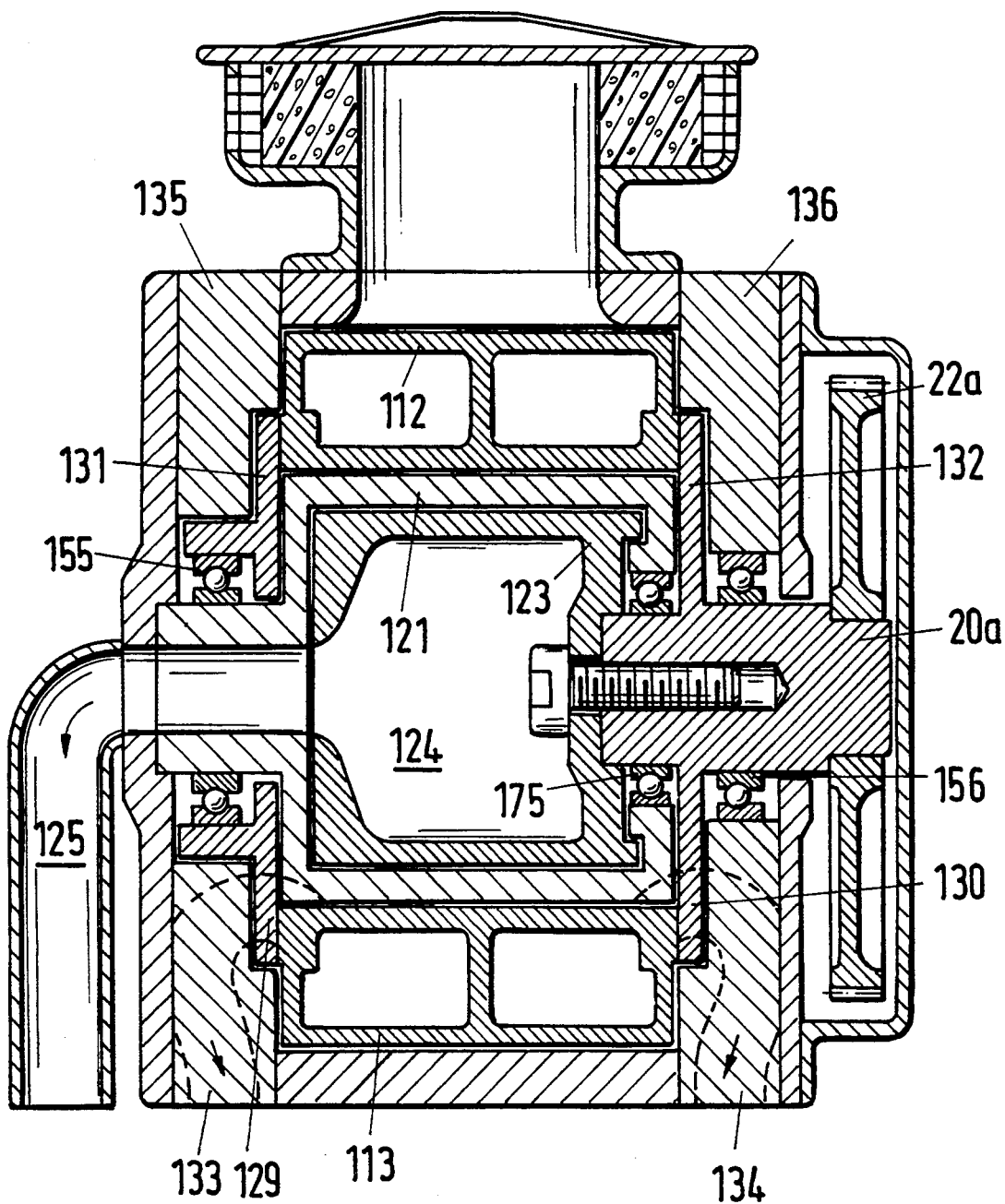
FIG. 13 shows a section along the line XIII—XIII of FIG. 9.

It can be seen from FIG. 15 that the cylindrical rotary disk valve 123 and the rotary disk valve 132 forms a rigid unit with a shaft 20a. Moreover, the shut-off piston rotors 112, 113 are connected with the opposite rotary disk valves 131, 132 (FIG. 13). The power piston rotors 114, 115 are correspondingly connected with the rotary disk valves 141, 142 and the shaft 61a. (FIG. 15). Due to this almost symmetrical construction of the individual compounds of the rotary piston internal combustion engine in the rotary piston system A as well as in the rotary piston B, conditions exist for all rotating components 20, 20a, 60a for achieving vibration-free running due to the rolling bearings 55, 56, 59, 62 and 155, 156, 159, 162, 175, 176 and, at the same time, with reduced friction and a total balancing of masses, achieve an improvement in the efficiency of the machine. This effect can be increased even more by reducing weight and volume further.

In each case at the end of the rotating shaft in the two embodiments 20, 20a, 61, 61a of the rotary piston systems A, B, mutually meshing spur gears 21, 22 and 21a, 22a are disposed, which produce the synchronicity of the running of the two rotary piston systems (FIGS. 8 and 15). In the embodiment of FIGS. 8 and 15, gear ratios of the spur gears of 2:1 and 1:1 are shown. The outer rolling bearings 55, 56, 59, 62 or 155, 156, 159, 162, which belong to the individual shafts, are disposed in side plates 18, 19 or 135, 136 of the housing. The hollow hubs 107, 121 run on additional inner rolling bearings 175, 176 (FIG. 15). The thereby created rotary piston internal combustion engine achieves a high speed stability owing to the fact that the bearings are relieved of centrifugal force loads.

We claim:

1. A rotary piston internal combustion engine, comprising:
   a common housing having two annular paths that overlap one another in a penetration region of said common housing,
   a stationary hollow hub in said housing,
   first and second rotary piston systems in said common housing, each said rotary piston system including at least one piston rotor, each said piston rotor having radial, external, peripheral areas in the form of partial cylindrical areas and having end faces, said second rotary piston system being constructed as a double piston system with two piston rotors revolving symmetrically about a common axis and about said stationary hollow hub,
   bearing means for mounting the two rotary piston systems on parallel axes in said common housing such that:
       said piston rotors of said two rotary piston systems mutually engage by meshing with one another, when said two rotary piston systems rotate in opposite directions,
       said piston rotors of said two rotary piston systems move in said two annular paths, respectively,
   said partial cylindrical areas of each said piston rotor of said first rotary piston system, during rotation thereof, forming a sealing gap alternately with:
       the housing, and
       one of said second rotary piston system and said stationary hollow hub, and
   said end faces of at least one piston rotor of said second rotary piston system, during mutual engagement of the rotary piston systems, working together with end faces of at least one piston rotor of said first rotary piston system to form sealed areas,
   a combustion chamber which is separate from said first and second rotary piston systems,
   duct means for connecting said annular paths with said separate combustion chamber such that said separate combustion chamber can receive a compressed mixture from said annular paths,
   the stationary hollow hub forming part of the duct means and having at least one control slot, which extends axially and discharges into one said annular path, and
   shut-off valve means for controlling flow through said duct means, said shut-off valve means including control bodies fixedly connected with the piston rotors.

2. The internal combustion engine of claim 1, wherein the annular paths have different radii.

3. The internal combustion engine of claim 1, wherein said second rotary piston system is constructed as said double piston system, and said first rotary piston system has only one piston rotor and runs at twice the speed of said second rotary piston system.

4. The internal combustion engine of claim 3,
   wherein the piston rotors of the second double piston system are constructed as power piston rotors, and the piston rotor of the first piston system works as a shut-off piston rotor,
   further including two hot gas ducts leading out of the combustion chamber,
   wherein said control bodies include two lateral rotary disk valves,
   wherein said duct means includes two discharge ducts connected with the combustion chamber, and
   wherein the power piston rotors divide an annular space in the housing into sections which are connected phasewise by said two lateral rotary disk valves with said two discharge ducts and with said two hot gas ducts.

5. The internal combustion engine of claim 4, wherein said rotary disk valves include control openings, which lie opposite one another in pairs.

6. The internal combustion engine of claim 5, wherein the control openings include inlet control openings and outlet control openings lying on different radii in the rotary disk valves.

7. The internal combustion engine of claim 6, wherein two inlet control openings are located diametrically opposite each other on one said rotary disk valve and two outlet control openings are located diametrically opposite each other on said one rotary disk valve.

8. The internal combustion engine of claim 6, wherein the control openings in the rotary disk valves are offset from each other by an angle, so that for each rotary disk valve, there is an outlet control opening positioned before each power piston rotor and an inlet control opening positioned behind each power piston rotor, in the direction of rotation of said power piston rotors.

9. The internal combustion engine of claim 3,
   wherein the piston rotors of the second double piston system are constructed as power piston rotors, and the piston rotor of the first piston system works as a shut-off piston rotor, and
   further including rotary disk valves which form a lateral boundary of said stationary hollow hub, and said at least one control slot of said stationary hollow hub runs into said one annular path associated with said second rotary piston system, directly before the penetration region, in the direction of rotation of said piston rotors of said double piston system.

10. The internal combustion engine of claim 9, wherein the stationary hollow hub includes a periphery with a groove thereat, said groove extending parallel to the common axis and being fit to the radial, external, peripheral area of said shut-off piston rotor.

11. The internal combustion engine of claim 10, wherein the hollow hub has an inner radial periphery which defines a boundary for said one annular path for the power piston rotors, and further including a cylindrical rotary disk valve encircled by said inner radial periphery, said cylindrical rotary disk valve rotating with the power piston rotors and having two axial control openings, which are diametrically opposite one another.

12. The internal combustion engine of claim 11, wherein the cylindrical rotary disk valve forms a fixed unit with a driving shaft and one said rotary disk valve.

13. The internal combustion engine of claim 11,
wherein the cylindrical rotary disk valve defines an internal space which functions as a supplying duct, and
further including:
a heat exchanger, and
a discharge line and a discharge pressure line which connect the internal space with the heat exchanger.

14. The internal combustion engine of claim 8, further including a fresh air inlet opening and an exhaust gas outlet opening next to one another and connected with said one annular path associated with said second rotary piston system.

15. The internal combustion engine of claim 14, further including an overflow line which connects the fresh air inlet opening with said first rotary piston system.

16. The internal combustion engine of claim 15, wherein the shut-off piston rotor of said one rotary piston system is formed on a hub and runs in the other said annular path which also includes said penetration region, said other annular path being connected with an air inlet opening and with an air outlet opening.

17. The internal combustion engine of claim 16, wherein the shut-off piston rotor has a closed contour on a periphery thereof.

18. The internal combustion engine of claim 16, wherein the shut-off piston rotor is constructed as a hollow body with different wall thicknesses therein.

19. The internal combustion engine of claim 16, wherein the shut-off piston rotor is mounted on a shaft and rotates therewith.

20. The internal combustion engine of claim 16, wherein the shut-off piston rotor has two convexly curved end surfaces.

21. The internal combustion engine of claim 16, further including an air filter in front of the air inlet opening.

22. The internal combustion engine of claim 16, further including an air blower having a duct which discharges laterally into the air outlet opening in the direction of the overflow line.

23. The internal combustion engine of claim 1, wherein each of the two rotary piston systems includes two piston rotors rotating symmetrically with respect to axes.

24. The internal combustion engine of claim 23, wherein the piston rotors of each piston system are arranged diametrically opposite to each other, and further including lateral rotary disk valves fastened thereto.

25. The internal combustion engine of claim 24, wherein the piston rotors of said second rotary piston system are constructed as power piston rotors, and the piston rotors of said first piston system are constructed as shut-off piston rotors, the power piston rotors including convex end surfaces and the shut-off piston rotors including concave end surfaces.

26. The internal combustion engine of claim 25, further including hot gas ducts leading out of the combustion chamber, and wherein the power piston rotors divide said one annular path in the housing into sections which are connected by the rotary disk valves as said control bodies phasewise with said hot gas ducts.

27. The internal combustion engine of claim 26, wherein each rotary disk valve of the power rotary piston system includes only two control openings.

28. The internal combustion engine of claim 27, wherein the two control openings are diametrically opposite each other and are, in the direction of rotation of the rotary piston system, positioned directly behind the piston rotors.

29. The internal combustion engine of claim 25, wherein said power piston rotors rotate about said stationary hollow hub and said at least one control slot is constructed as a flushing slot which discharges opposite the penetration region into said one annular path.

30. The internal combustion engine of claim 23, further including a fresh air inlet opening and an exhaust gas outlet opening which discharge into said one annular path associated with said second rotary piston system.

31. The internal combustion engine of claim 30, wherein the exhaust gas outlet opening is larger than the fresh air inlet opening, and said fresh air inlet opening lies directly next to said exhaust gas outlet opening in the direction of rotation of said piston rotors of said second rotary piston system.

32. The internal combustion engine of claim 25,
further including a heat exchanger,
wherein the two shut-off piston rotors of the rotary piston system divide the annular path associated therewith into two sections of equal size, and
further including control openings protruding into said annular path associated with said first rotary piston system for supplying fresh air into the heat exchanger, said control openings being diametrically disposed with respect to each other in the lateral rotary disk valves and positioned before the shut-off piston rotors, in the direction of rotation of said shut-off piston rotors.

33. The internal combustion engine of claim 32, further including a second hollow hub and a cylindrical rotary disk valve enclosed by said hollow hub, and wherein the shut-off piston rotors revolve around said second hollow hub.

34. The internal combustion engine of claim 33, wherein
said power piston rotors include radial, external peripheral areas, and
the second hollow hub has a control opening directed towards the penetration region, and a periphery with a groove which extends parallel to said axis and is shaped to conform to the radial, external peripheral areas of the power piston rotors.

35. The internal combustion engine of claim 33, wherein the cylindrical rotary disk valve includes two control openings positioned diametrically opposite one another.

36. The internal combustion engine of claim 35, wherein one of the control openings in the cylindrical rotary disk valve and the stationary control opening of the second hollow hub near the penetration region are disposed relative to each other so as to provide communication between a respective control opening in a respective rotary disk valve and an interior space within said cylindrical rotary disk valve.

37. The internal combustion engine of claim 36, further including a discharge line leading through the second hollow hub out of the interior space.

38. The internal combustion engine of claim 33, further including an air outlet opening of said first rotary piston system which discharges directly into the heat exchanger.

39. The internal combustion engine of claim 32, wherein the heat exchanger is disposed below the two rotary piston systems and said combustion chamber is positioned above at least one said rotary piston system, and further including an extended discharge pressure line leading from the heat exchanger to the combustion chamber.

40. The internal combustion engine of claim 33, wherein the cylindrical rotary disk valve and one said lateral rotary disk valve form a fixed unit with a shaft and are connected with the other said rotary disk valve through said shut-off piston rotors.

41. The internal combustion engine of claim 1, wherein said bearing means includes roller bearings for accommodating rotating components of said two rotary piston systems.

42. The internal combustion engine of claim 41, wherein said roller bearings include outer rolling bearings disposed in side plates of the housing.

43. The internal combustion engine of claim 41, further including a second hollow hub associated with the other rotary piston system, and wherein both hollow hubs are supported on inner rolling bearings in said housing.

44. The internal combustion engine of claim 1, wherein each said rotary piston system includes a shaft about which said piston rotors rotate, and further including meshing spur gears at one end of the shafts of the rotary piston systems.

45. The internal combustion engine of claim 44, wherein the spur gears are coupled with a gear ratio of 2:1.

46. The internal combustion engine of claim 44, wherein the spur gears are coupled with a gear ratio of 1:1.

* * * * *